United States Patent
Stewart et al.

(10) Patent No.: US 10,120,561 B2
(45) Date of Patent: Nov. 6, 2018

(54) MAXIMUM SPEED CRITERION FOR A VELOCITY GESTURE

(75) Inventors: Aaron Michael Stewart, Raleigh, NC (US); Thomas John Sluchak, Apex, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 654 days.

(21) Appl. No.: 13/101,601

(22) Filed: May 5, 2011

(65) Prior Publication Data

US 2012/0280918 A1 Nov. 8, 2012

(51) Int. Cl.
*G06F 3/0488* (2013.01)
*G06F 3/0485* (2013.01)
*G06F 3/044* (2006.01)

(52) U.S. Cl.
CPC ........ *G06F 3/04883* (2013.01); *G06F 3/0485* (2013.01); *G06F 3/044* (2013.01); *G06F 3/0488* (2013.01)

(58) Field of Classification Search
CPC .............. G06F 3/04883; G06F 3/017; G06F 2203/04807; G06F 3/0418; G06F 2203/04808; G06F 3/041; A61B 8/462; A61B 8/463; H04N 5/23216; H04N 5/23293
USPC .................................................. 345/173–179
See application file for complete search history.

(56) References Cited

U.S. PATENT DOCUMENTS

| | | | |
|---|---|---|---|
| 5,327,161 A * | 7/1994 | Logan et al. ................. | 345/157 |
| 2003/0043113 A1* | 3/2003 | Itoh ............................... | 345/156 |
| 2006/0055662 A1* | 3/2006 | Rimas-Ribikauskas et al. ........... 345/156 | |
| 2007/0146347 A1* | 6/2007 | Rosenberg ..................... | 345/173 |
| 2009/0195518 A1* | 8/2009 | Mattice et al. ................ | 345/177 |
| 2009/0267909 A1* | 10/2009 | Chen et al. .................... | 345/173 |
| 2010/0069123 A1* | 3/2010 | Araradian et al. ............ | 455/566 |
| 2010/0083373 A1* | 4/2010 | White ...................... | G06F 3/017 726/21 |
| 2010/0107116 A1* | 4/2010 | Rieman ................. | G06F 3/0488 715/784 |
| 2010/0164877 A1* | 7/2010 | Yu .......................... | G06F 9/4443 345/173 |
| 2010/0207901 A1* | 8/2010 | Shin ..................... | G06F 3/04883 345/173 |
| 2010/0306712 A1* | 12/2010 | Snook ................ | G06K 9/00342 715/863 |
| 2010/0321319 A1* | 12/2010 | Hefti ............................ | 345/173 |

(Continued)

FOREIGN PATENT DOCUMENTS

| | | |
|---|---|---|
| CN | 101277497 | 10/2008 |
| CN | 101308437 | 11/2008 |
| CN | 101424997 | 5/2009 |

*Primary Examiner* — Michael Faragalla
*Assistant Examiner* — Sujit Shah
(74) *Attorney, Agent, or Firm* — Kunzler, PC (57) ABSTRACT

An apparatus, system, and method for a maximum speed criterion for a velocity gesture. The apparatus includes an input sensor, a processor, and a memory. The apparatus also includes a detection module that detects fulfillment of velocity gesture criteria on the input sensor in communication with the processor. The velocity gesture criteria may include a movement below a maximum speed. The apparatus also includes an initiation module that initiates a velocity gesture function in response to the detection module detecting fulfillment of the velocity gesture criteria.

15 Claims, 4 Drawing Sheets

(56) References Cited

U.S. PATENT DOCUMENTS

2011/0066984 A1* 3/2011 Li ..................... G06F 3/04883
                                                      715/863
2011/0090155 A1* 4/2011 Caskey ................ G06F 1/1641
                                                      345/173

* cited by examiner

MAXIMUM SPEED CRITERION FOR A VELOCITY GESTURE

FIELD

The subject matter disclosed herein relates to a velocity gesture and more particularly relates to maximum speed criterion for a velocity gesture.

BACKGROUND

Description of the Related Art

Computing devices have decreased in size such that many such devices, Smartphones, laptops, tablet computing devices, and the like, have integrated input sensors for user input eliminating the need for an external mouse. These input sensors typically include touchpads, trackpads, and touchscreens, controlling a cursor or other movement on a computing device by detecting touch and/or movement of a user.

However, input sensors have also decreased in size. Consequently, a user may struggle to accurately convey the user's desired cursor movements through these input sensors.

BRIEF SUMMARY

Based on the foregoing discussion, the inventors have recognized a need for an apparatus, system, and method for a maximum speed criterion in recognizing a velocity gesture, such as a "drag and hold" gesture. Beneficially, such an apparatus, system, and method would not initiate the velocity gesture if an input sensor detects movement above a maximum speed.

The embodiments of the present disclosure have been developed in response to the present state of the art, and in particular, in response to the problems and needs in the art that have not yet been fully solved by currently available velocity gesture criteria. Accordingly, the embodiments have been developed to provide a method, apparatus, and system for a maximum speed criterion for a velocity gesture that overcome many or all of the above-discussed shortcomings in the art.

An apparatus is provided with an input sensor, a processor, a memory, and a plurality of modules configured to functionally execute the steps of detecting fulfillment of velocity gesture criteria and initiating a velocity gesture function. These modules in the described embodiments include a detection module and an initiation module.

In one embodiment, the detection module detects fulfillment of velocity gesture criteria on the input sensor in communication with the processor. The velocity gesture criteria may include a movement below a maximum speed. In one embodiment, the initiation module initiates a velocity gesture function in response to the detection module detecting fulfillment of the velocity gesture criteria.

A method is also presented. The method in the disclosed embodiments substantially includes the steps to carry out the functions presented above with respect to the operation of the described apparatus.

The method includes, in one embodiment, detecting fulfillment of velocity gesture criteria on an input sensor in communication with an information handling device. The velocity gesture criteria may include a movement below a maximum speed. In one embodiment, the method also includes initiating a velocity gesture function on the information handling device in response to detecting fulfillment of the velocity gesture criteria.

A computer program product is also presented. In one embodiment, the computer program product includes detecting fulfillment of velocity gesture criteria on an input sensor in communication with an information handling device. The velocity gesture criteria may include a movement below a maximum speed. In one embodiment, the method also includes initiating a velocity gesture function on the information handling device in response to detecting fulfillment of the velocity gesture criteria.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Figure 1:
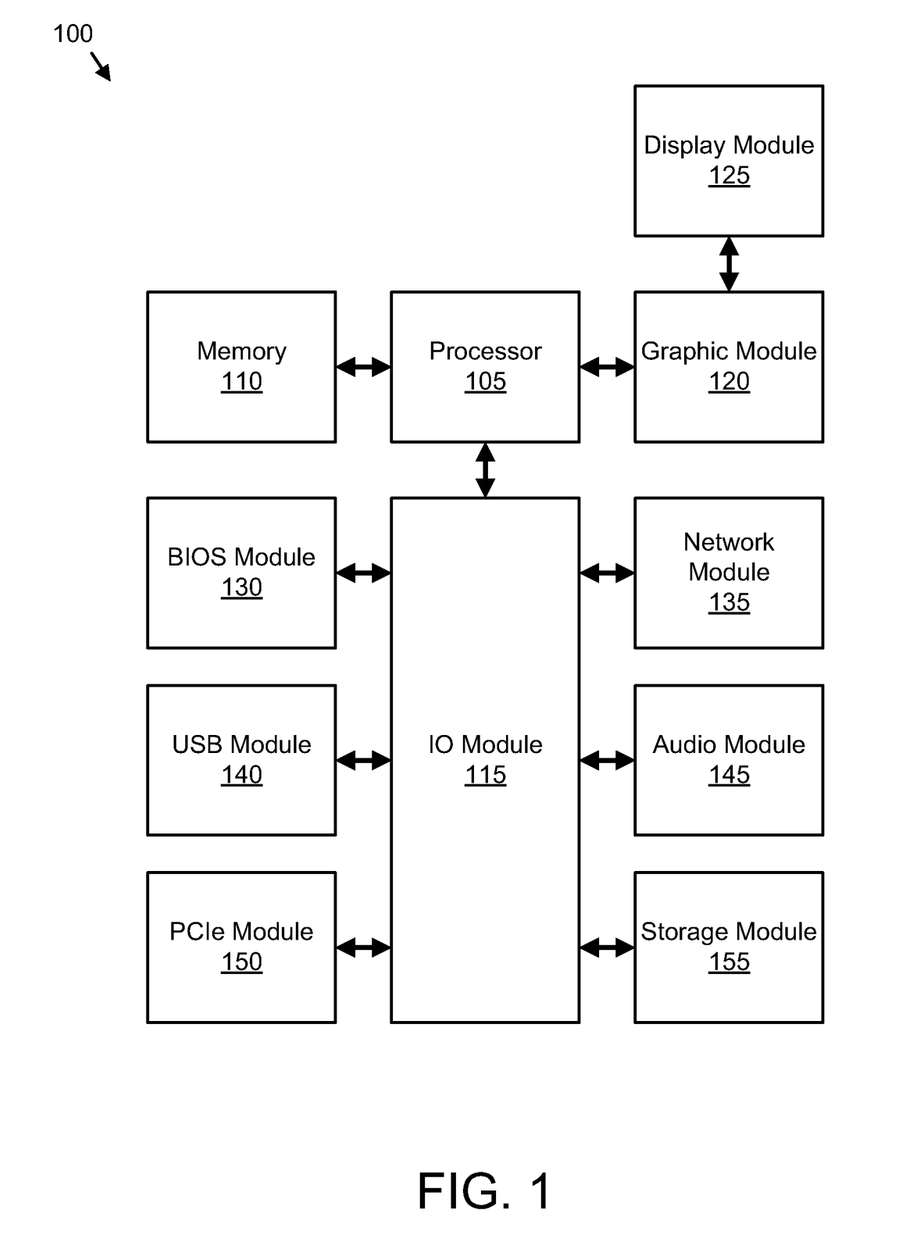
FIG. 1 is a schematic block diagram illustrating one embodiment of a computing device in accordance with the present subject matter.

FIG. 1 is a schematic block diagram illustrating one embodiment of a computing device 100. The computing device 100 includes a processor 105, a memory 110, an IO module 115, a graphics module 120, a display module 125, a basic input/output system ("BIOS") module 130, a network module 135, a universal serial bus ("USB") module 140, an audio module 145, a peripheral component interconnect express ("PCIe") module 150, and a storage module 155. One of skill in the art will recognize that other configurations of a computing device 100 or multiple computer systems 100 may be employed with the embodiments described herein.

The processor 105, memory 110, IO module 115, graphics module 120, display module 125, BIOS module 130, network module 135, USB module 140, audio module 145, PCIe module 150, and storage module 155, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 155. The storage module 155 may comprise at least one Solid State Device ("SSD"). In addition, the storage module 155 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110 and the graphic module 120.

In addition, the processor 105 may communicate with the IO module 115. The IO module 125 may support and communicate with the BIOS module 130, the network module 135, the PCIe module 150, and the storage module 155.

The PCIe module 150 may communicate with the IO module 115 for transferring data or power to peripheral devices. The PCIe module 150 may include a PCIe bus for attaching the peripheral devices. The PCIe bus can logically connect several peripheral devices over the same set of connections. The peripherals may be selected from a printer, a joystick, a scanner, or the like. The PCI module 150 may also comprise an expansion card as is well known to those skilled in the art.

The BIOS module 130 may communicate instructions through the IO module 115 to boot the computing device 100, so that computer readable software instructions stored on the storage module 155 can load, execute, and assume control of the computing device 100. Alternatively, the BIOS module 130 may comprise a coded program embedded on a chipset that recognizes and controls various devices that make up the computing device 100.

The network module 135 may communicate with the IO module 115 to allow the computing device 100 to communicate with other devices over a network. The devices may include routers, bridges, computers, printers, and the like. The display module 125 may communicate with the graphic module 120 to display information. The display module 125 may be a cathode ray tube ("CRT"), a liquid crystal display ("LCD") monitor, or the like. The USB module 140 may communicate with one or more USB compatible devices over a USB bus. The audio module 145 may generate an audio output.

Figure 2:
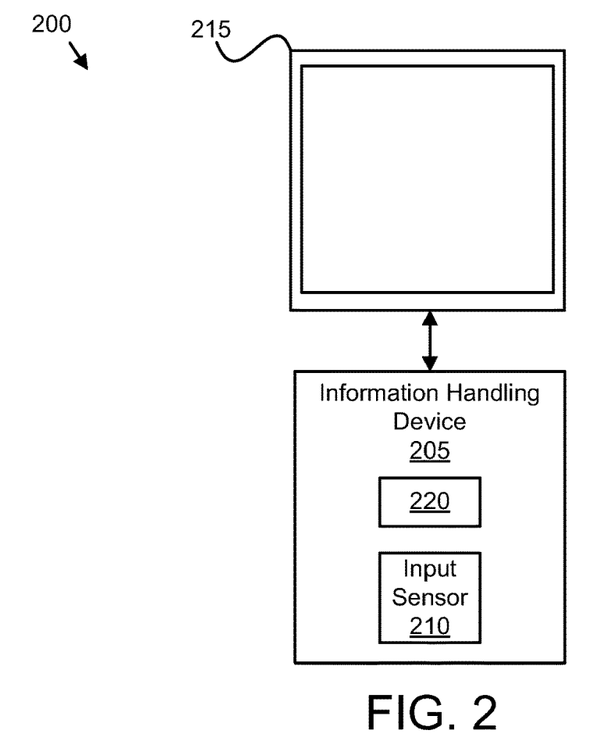
FIG. 2 is a schematic block diagram illustrating one embodiment of a system for a maximum speed criterion for a velocity gesture in accordance with the present subject matter.

FIG. 2 illustrates one embodiment of a system 200 for system for a maximum speed criterion for a velocity gesture. The system includes an information handling device 205 in communication with a display 215. The information handling device 205 includes an input sensor 210 and a velocity gesture apparatus 220.

The information handling device 205 may include similar components to the computing system 100 depicted in FIG. 1 including memory, a storage device storing computer readable programs, and/or a processor that executes the computer readable programs as is known to those skilled in the art. The information handling device 205, in certain embodiments, may be embodied as a portable or handheld electronic device and/or portable or handheld computing device such as a personal desktop assistant ("PDA"), a tablet computer, a slate or pad computer, an e-Book reader, a mobile phone, a Smartphone, and the like. In one embodiment, the information handling device 205 is embodied as a Blackberry® device manufactured by Research In Motion® ("RIM®"). In other embodiments, the information handling device 205 may be embodied by a desktop computer, a portable computer, a server, a mainframe computer, logic hardware, and/or the like.

The input sensor 210 may be in communication with the information handling device 205 and/or a processor of the information handling device 205. In one embodiment, the input sensor 210 is integrated with the information handling device 205. In another embodiment, the input sensor 210 communicates with the information handling device 205 through a wired or wireless connection. The input sensor 210 may be responsive to user touch and/or user movement. For example, in one embodiment, the input sensor 210 is receptive to a user making contact with the input sensor 210 at a certain point on the input sensor 210. In this embodiment, the input sensor 210 may register a movement of the user as the contact point changes (e.g. the user maintains contact with the input sensor 210 but slides a finger across the input sensor 210). In one embodiment, the input sensor 210 is receptive to movement from a user in close proximity to the input sensor 210. The input sensor 210 may translate the touch and/or movement into a relative position on the display 215 (e.g. operating as a computer mouse for the information handling device 205). The input sensor 210 may be a touchpad, a touchscreen (e.g. using a virtual pointing device within the touchscreen), an optical sensor trackpad such as that found on certain Blackberry® devices, or other suitable input sensor 210.

The display 215 may be embodied as a Liquid Crystal Display ("LCD") screen, a plasma screen, a projector projecting an image, and the like. In one embodiment, the display 215 is a touchscreen display receiving touch input from a user on a display surface. The display 215 communicates with and/or is controlled by the information handling device 205. In one embodiment, the display 215 is integrated with the information handling device 205. In another embodiment, the display 215 is embodied separately from the information handling device 205 and communicates with the information handling device 205 over a wired and/or wireless connection.

The velocity gesture apparatus 220 initiates a velocity gesture function in response to detecting fulfillment of velocity gesture criteria. Due to the often small size of an input sensor, many information handling devices provide a velocity gesture function to enhance a user's interaction with the information handling device. Specifically, the velocity gesture function may include a "coasting" function that maintains a movement including a speed and/or direction on the display without a user continually providing input to sustain the movement. The velocity gesture function may include maintaining pointer movement across the display, maintaining scrolling of a document, maintaining character movement in a game, continual panning of a viewpoint in an application, and/or the like. For example, with the velocity gesture function, a user can avoid iterative flicking across the input sensor to achieve the desired effect on the display (e.g. pointer movement).

The velocity gesture function may be triggered by a velocity gesture, which may include a particular movement and/or touch by the user on and/or in proximity to the input sensor. In one embodiment, the velocity gesture may comprise a "drag and hold" gesture. Furthermore, the velocity gesture may be defined, detected, characterized, and/or comprised of velocity gesture criteria (may also referred to as "drag and hold" criteria in one embodiment). The information handling device may detect a velocity gesture based on the velocity gesture criteria. Conventional information handling devices may, however, invoke the velocity gesture function when the user does not intend it to be invoked.

The velocity gesture apparatus 220 includes enhanced velocity gesture criteria to better determine when a user intends to invoke the velocity gesture. Specifically, the velocity gesture apparatus 220 may better distinguish between a user who initiates a fast flick across the input sensor 210 desiring a single rapid movement on the display 215, and a user who intends to invoke the velocity gesture; a fast movement may be more indicative of intended flicking. In one embodiment, the velocity gesture criteria of the velocity gesture apparatus 220 includes a criterion that a movement be below a maximum speed. Consequently, detected movements above the maximum speed may not trigger the velocity gesture function, reducing the likelihood that the velocity gesture apparatus 220 will invoke the velocity gesture function from the user's flicking movements. The velocity gesture apparatus 220 may be embodied as software, such as a driver or application on the information handling device 205, hardware, or a combination of hardware and software.

Figure 3:
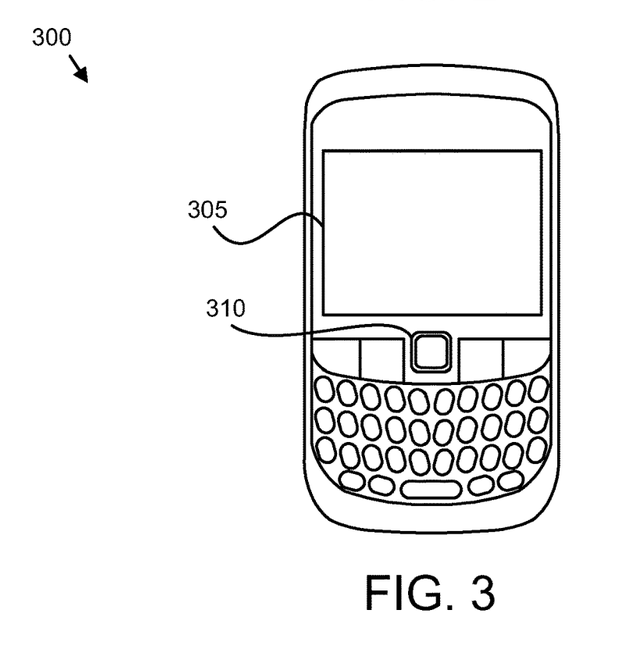
FIG. 3 illustrates one embodiment of an information handling device in accordance with the present subject matter.

FIG. 3, illustrates one embodiment of an information handling device 300 in accordance with the present subject matter. The information handling device 300 is depicted as a Smartphone and includes a display 305 and an input sensor 310. The information handling device 300 may be one embodiment of the system 200 depicted in FIG. 2. In the depicted embodiment, the display 305 and input sensor 310 are integrated with the information handling device 300 and may be substantially similar to the display 215 and input sensor 210 described above in relation to FIG. 2. Furthermore, the information handling device 300 may also include a velocity gesture apparatus substantially similar to the velocity gesture apparatus described in relation to FIG. 2, which may initiate a velocity gesture function in response to detecting velocity gesture function criteria including movement below a maximum speed.

Figure 4:
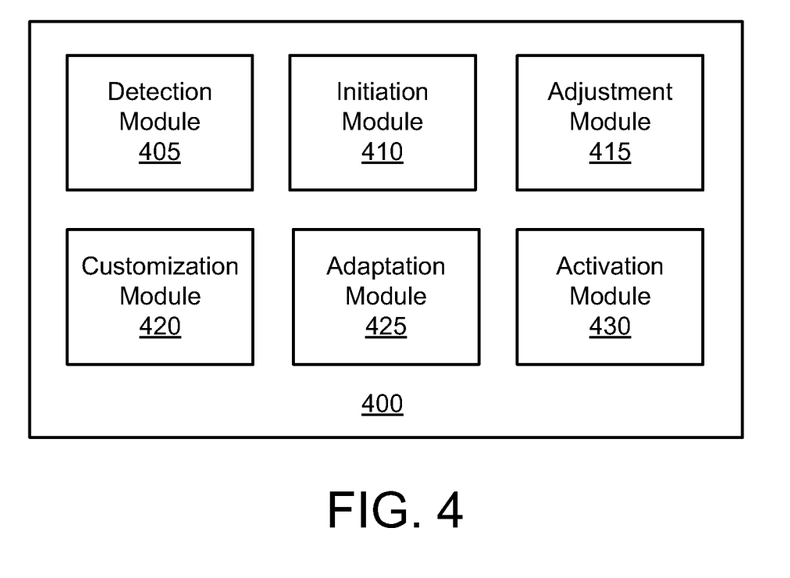
FIG. 4 is a schematic block diagram illustrating one embodiment of an apparatus for a maximum speed criterion for a velocity gesture in accordance with the present subject matter.

FIG. 4 illustrates one embodiment of an apparatus 400 for a maximum speed criterion for a velocity gesture. The apparatus 400 may comprise one embodiment of the velocity gesture apparatus 220 depicted in FIG. 2. The description of the apparatus 400 refers to elements of FIGS. 1-2, like numbers referring to like elements. The apparatus 400 includes one or more of a detection module 405, an initiation module 410, an adjustment module 415, a customization module 420, an adaptation module 425, and an activation module 430.

The detection module 405 detects fulfillment of velocity gesture criteria on the input sensor 210. The input sensor 210 may be in communication with and/or integrated with an information handling device 205 such as that described above. Furthermore, the detection module 405 may be in communication with the input sensor 210 to detect touch and/or movement on the input sensor 210 and/or to receive information about touch and/or movement on the input sensor 210. In one embodiment, the detection module 405 may both detect touch and/or movement on the input sensor 210, and determine whether the touch/movement fulfills the velocity gesture criteria. In some embodiments, the detection module 405 detects fulfillment of velocity gesture criteria from information of touch and/or movement received from another component of the information handling device 205 and/or input sensor 210. As described above, input sensor 210 may be receptive to touch and/or movement. In certain embodiments, an input sensor 210 senses movement of a contact point (e.g. a touch) on the input sensor 210 (e.g. a user places a finger on the input sensor 210 and then slides the finger across the input sensor 210 while maintaining contact with the input sensor 210).

The velocity gesture criteria may include a plurality of requirements and/or conditions for characteristics that a user's physical action—including movement and/or touch—may meet before the detection module 405 detects fulfillment of the velocity gesture criteria. The detection module 405 may determine whether each velocity criteria is met in a specified order or in any order. Furthermore, the detection module 405 may simultaneously determine whether two or more velocity criteria are met. In one embodiment, the velocity gesture criteria include a movement below a maximum speed. The movement below a maximum speed may include movement of a user as part of a physical action of the user on and/or in proximity to the input sensor. Therefore, if a particular movement exceeds the maximum speed, the particular movement may not meet the velocity gesture criteria. In one embodiment, other velocity criteria may include, but is not limited to, movement being above a minimum speed, a minimum distance traveled across the input sensor 210, and/or a minimum delay (e.g. a pause or a hold of a position) following an initial movement. In one embodiment, the velocity gesture criteria comprise drag and hold criteria (e.g. criteria for initiating a coasting function).

The initiation module 410 initiates a velocity gesture function in response to the detection module 405 detecting fulfillment of the velocity gesture criteria. As described above, in one embodiment, the velocity gesture function comprises a coasting function. As described above, the velocity gesture function may include maintaining a movement including a speed and/or direction on the display 215 without a user continually providing input to sustain the movement. Examples may include, but are not limited to, maintaining pointer movement across the display 215, maintaining scrolling of a document, maintaining character movement in a game, and continual panning of a viewpoint in an application.

In one embodiment, the initiation module 410 initiates the velocity gesture function in response to the detection module 405 detecting fulfillment of the velocity gesture criteria if a velocity gesture option has been activated. When activated, a velocity gesture option, in one embodiment, allows a velocity gesture function to be initiated when the detection module 405 detects fulfillment of the velocity gesture criteria. In one embodiment, the velocity gesture option, when deactivated, prevents the initiation module 410 from initiating the velocity gesture function. In one embodiment, the detection module 405 does not monitor for fulfillment of the velocity gesture criteria unless the velocity gesture option has been activated.

The velocity gesture option may be activated by a user, though, for example, a user interface of an application, operating system, and/or the like, executing on and/or in connection with the information handling device 205. In one embodiment, the velocity gesture option is activated by an initial tap on the input sensor 210, a switch or button located on the information handling device 205 (beneath the input sensor 210, positioned away from the input sensor 210), and/or the like.

The adjustment module 415 allows a user to independently adjust the velocity gesture criteria. In one embodiment, the adjustment module 415 adjusts the maximum speed (e.g. a value indicating a certain speed for the maximum speed) in response to a user selection. For example, if a user wishes to increase the maximum speed criterion so that the velocity gesture function may be initiated with movements faster than those currently, the adjustment module 415 may allow the user to make such an increase. In one embodiment, the user may adjust the velocity gesture criteria, including the maximum speed criterion, through a user interface of an application, an operating system, and the like, executing on and/or in connection with the information handling device 205. In one embodiment, the user may adjust the velocity gesture criteria using predetermined input on the input sensor 210, a switch or button on the information handling device 205, and the like.

The customization module 420 changes one or more of the velocity gesture criteria, such as the maximum speed, based on a user identity. In one embodiment, the velocity gesture criteria are user-specific. A set of velocity gesture criteria (e.g. a value for a maximum speed, a minimum speed, and the like) may be associated with a particular user profile, user account, user identifier, and/or the like. For example a particular set of velocity gesture criteria may be associated with a user account on an operating system of the information handling device 205. The customization module 420 may sense, determine, and/or identify a current user and customize the velocity gesture criteria for that user (e.g. referencing stored velocity gesture criteria associated with the user's profile).

The adaptation module 425 adapts, changes, and/or customizes one or more of the velocity gesture criteria such as the maximum speed. In one embodiment, the adaptation module 425 adapts the velocity gesture criteria based on characteristics of the information handling device 205 (e.g. on which the adaptation module 425 resides) such as an information handling device type, an input sensor type, a display size, a software application in use, and/or a current task being performed. For example, the adaptation module 425 may increase or decrease a speed value of the maximum speed in the maximum speed criterion depending on the display size of the information handling device 205. In one embodiment, the adaptation module 425 adapts the velocity gesture criteria based on a user history and/or user characteristics. Specifically, the adaptation module 425 may increase a value of the maximum speed criterion in response to detecting that a particular user's movements are characterized by a predetermined number of movements within a predetermined time frame above a predetermined speed (e.g. the particular user often flicks the input sensor 210 at a high rate of speed).

In one embodiment, the adaptation module 425 provides a "learning mode" in which a user may demonstrate, to the adaptation module 425, a movement the user would like to trigger a velocity gesture function. The adaptation module 425 may determine velocity gesture criteria from the user's demonstration and assign these velocity gesture criteria to the user, the information handling device 205, and/or the like.

The activation module 430 receives an activation indicator based on physical input from a user and activates a velocity gesture option in response to receiving the activation indicator. As described above, when activated, a velocity gesture option, in one embodiment, allows a velocity gesture function to be initiated when the detection module 405 detects fulfillment of the velocity gesture criteria. In one embodiment, the velocity gesture option, when deactivated, prevents the initiation module 410 from initiating the velocity gesture function. In one embodiment, the detection module 405 does not monitor for fulfillment of the velocity gesture criteria unless the velocity gesture option has been activated.

The activation indicator may include a user indicating to the activation module 430 that the user would like the velocity gesture option to be available. The user may indicate to the activation module 430 though, for example, a user interface of an application, operating system, and/or the like. In one embodiment, the velocity gesture option is activated and the activation indicator given by an initial tap on the input sensor 210, a switch or button located on the information handling device 205 (beneath the input sensor 210, positioned away from the input sensor 210), and/or the like.

Figure 5:
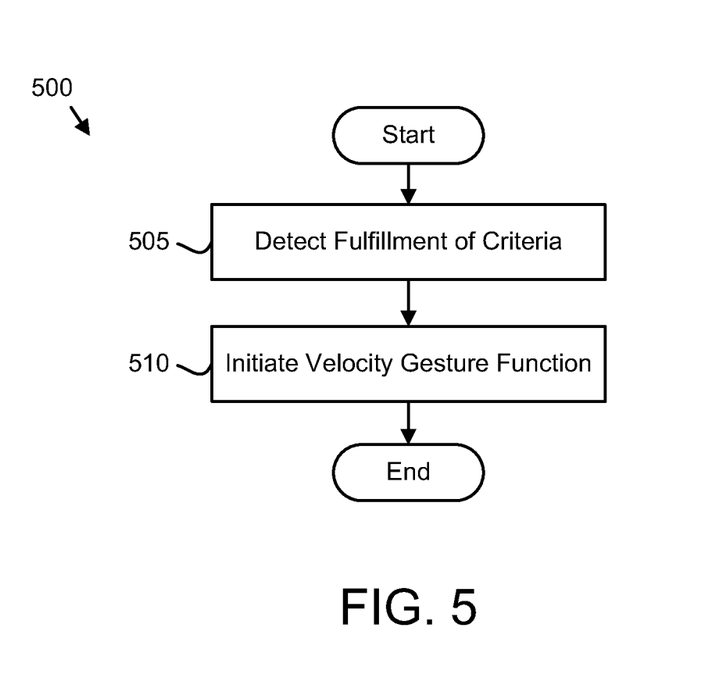
FIG. 5 is a schematic flow chart diagram illustrating one embodiment of a method for a maximum speed criterion for a velocity gesture in accordance with the present subject matter.

FIG. 5 illustrates one embodiment of a method 500 for a maximum speed criterion for a velocity gesture. The method 500 may implement at least a portion of the functions of the apparatus 400 of FIG. 4. The description of the method 500 refers to elements of FIGS. 1-2 and 4, like numbers referring to like elements.

The method 500 begins and the detection module 405 detects 505 fulfillment of velocity gesture criteria on an input sensor 210. The input sensor 210 may be in communication with a processor. In one embodiment, the processor is part of an information handling device 205 as described above. The velocity gesture criteria may include a movement below a maximum speed. Next, the initiation module 410 initiates 510 a velocity gesture function in response to the detection module 405 detecting fulfillment of the velocity gesture criteria. The initiation module 410 may initiate the velocity gesture function on the information handling device 205. Then, the method 500 ends.

Figure 6:
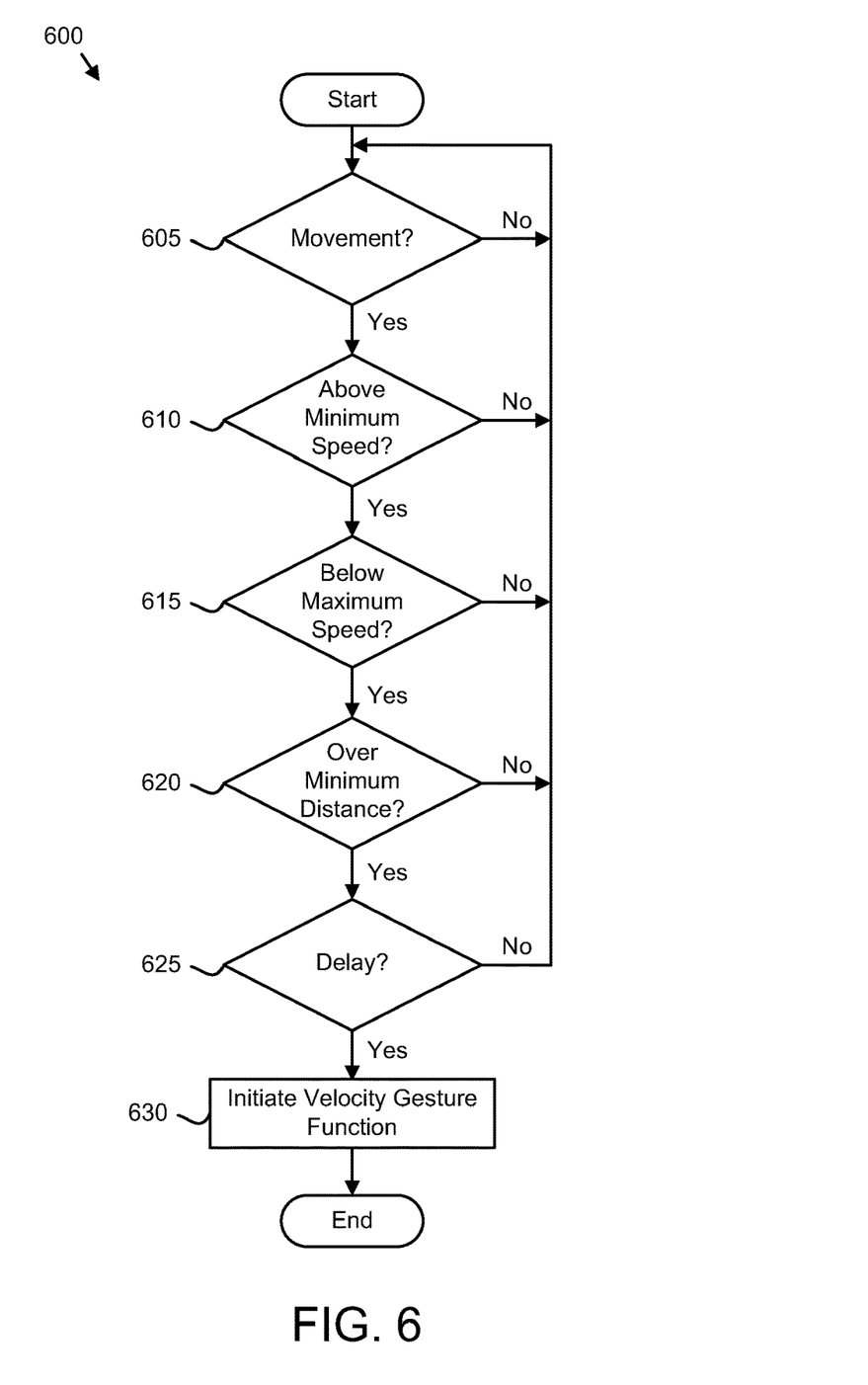
FIG. 6 is a detailed schematic flow chart diagram illustrating another embodiment of a method for a maximum speed criterion for a velocity gesture in accordance with the present subject matter.

FIG. 6 illustrates another embodiment of a method 600 for a maximum speed criterion for a velocity gesture. The method 600 may implement at least a portion of functions of the apparatus 400 of FIG. 4. The description of the method 600 refers to elements of FIGS. 1-2 and 4, like numbers referring to like elements.

The method 600 begins and the detection module 405 monitors 605 for movement on the input sensor 210. When the detection module 405 detects 605 movement, it determines 610 whether the movement is above a minimum speed. If the detection module 405 determines 610 that the movement is not above a minimum speed, the method 600 returns to step 605 to monitor 605 for movement on the input sensor 210.

Alternatively, the detection module 405 determines 610 that the movement is above a minimum speed. Next, the detection module 405 determines 615 whether the movement is below a maximum speed. If the detection module 405 determines 615 that the movement is not below a maximum speed, the method returns to step 605 to monitor for movement on the input sensor 210.

Alternatively, the detection module 405 determines 615 that the movement is below the maximum speed. Next, the detection module 405 determines 620 whether the movement is over a minimum distance (e.g. across the input sensor 210). If the detection module 405 determines 620 that the movement is not over the minimum distance, the method returns to step 605 to monitor for movement on the input sensor 210.

Alternatively, the detection module 405 determines 620 that the movement is over the minimum distance. Next, the detection module 405 determines 625 whether there is a minimum delay following the movement. If the detection module 405 determines 625 that there is no minimum delay following the movement, the method 600 returns to step 605 to monitor for movement on the input sensor 210.

Alternatively, the detection module 405 determines 625 that there is the minimum delay following the movement. Next, the initiation module 410 initiates 630 a velocity gesture function and the method 600 ends. Although the method 600 depicts steps 605-625 in a specified order, the detection module 405 may perform steps 605-625 in various orders and/or simultaneously.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    an input sensor selected from the group consisting of a touch sensor and an optical sensor;
    a processor in communication with the input sensor;
    a memory storing code for execution by the processor, the code comprising code that:
        receives an activation indicator based on physical input from a user and activating a velocity gesture option in response to receiving the activation indicator, wherein the activation indicator is received by physical input selected from a group consisting of a tap on the input sensor, a switch located on the apparatus and beneath the input sensor, a switch located on the apparatus and positioned away from the input sensor, a button located on the apparatus and beneath the input sensor, and a button located on the apparatus and positioned away from the input sensor;
        detects fulfillment of velocity gesture criteria on the input sensor after receiving the activation indicator, the velocity gesture criteria comprising drag and hold criteria and a maximum speed for a velocity gesture function, wherein the detecting comprises determining that a speed for a velocity gesture does not go above the maximum speed, and wherein the velocity gesture comprises a single touch of the input sensor by a user during which contact with the input sensor is maintained after a contact point is sensed by the input sensor;
        initiates the velocity gesture function in response to the activated velocity gesture option and the detecting fulfillment of the velocity gesture criteria, wherein the velocity gesture function comprises a coasting function in which a movement on a display is maintained without the user continually providing input to sustain the movement on the display; and
adapts one or more of the velocity gesture criteria based on a learning mode in which the user demonstrates a movement the user would like to trigger the velocity gesture function, and the velocity gesture criteria is determined from the movement the user demonstrates, wherein adapting one or more of the velocity gesture criteria comprises increasing the maximum speed for the velocity gesture function in response to a predetermined number of movements within a predetermined time frame being above a predetermined speed, and wherein the maximum speed is increased to a speed higher than the predetermined speed.

2. The apparatus of claim 1, wherein the velocity gesture criteria further comprise one or more of a minimum speed, a minimum distance traveled across the input sensor, and a minimum delay following an initial movement.

3. The apparatus of claim 1, further comprising code that allows a user to independently adjust one or more of the velocity gesture criteria.

4. The apparatus of claim 1, wherein the velocity gesture criteria are user-specific, the apparatus further comprising code that changes one or more of the velocity gesture criteria based on a user identity.

5. The apparatus of claim 1, further comprising code that adapts one or more of the velocity gesture criteria based on one or more of an information handling device type, an input sensor type, a display size, a software application in use, and a current task being performed.

6. The apparatus of claim 1, wherein the input sensor is responsive to one or more of user touch and user movement.

7. The apparatus of claim 1, wherein the input sensor is selected from a group consisting of a touchpad, a touchscreen and an optical sensor trackpad.

8. A method comprising:
receiving an activation indicator based on physical input from a user and activating a velocity gesture option in response to receiving the activation indicator, wherein the activation indicator is received by physical input selected from a group consisting of a tap on an input sensor in communication with an information handling device, a switch located on the information handling device and beneath the input sensor, a switch located on the information handling device and positioned away from the input sensor, a button located on the information handling device and beneath the input sensor, and a button located on the information handling device and positioned away from the input sensor;
detecting fulfillment of velocity gesture criteria on the input sensor after receiving the activation indicator, the velocity gesture criteria comprising drag and hold criteria and a maximum speed for a velocity gesture function, wherein the detecting comprises determining that a speed for a velocity gesture does not go above the maximum speed, and wherein the velocity gesture comprises a single touch of the input sensor by a user during which contact with the input sensor is maintained after a contact point is sensed by the input sensor;
initiating the velocity gesture function on the information handling device in response to the activated velocity gesture option and detecting fulfillment of the velocity gesture criteria, wherein the velocity gesture function comprises a coasting function in which a movement on a display is maintained without the user continually providing input to sustain the movement on the display; and
adapting one or more of the velocity gesture criteria based on a learning mode in which the user demonstrates a movement the user would like to trigger the velocity gesture function, and the velocity gesture criteria is determined from the movement the user demonstrates, wherein adapting one or more of the velocity gesture criteria comprises increasing the maximum speed for the velocity gesture function in response to a predetermined number of movements within a predetermined time frame being above a predetermined speed, and wherein the maximum speed is increased to a speed higher than the predetermined speed.

9. The method of claim 8, wherein the velocity gesture criteria further comprise one or more of a minimum speed, a minimum distance traveled across the input sensor, and a minimum delay following initial movement.

10. The method of claim 8, further comprising adjusting the maximum speed in response to a user selection.

11. The method of claim 8, further comprising changing the maximum speed based on a user identity.

12. The method of claim 8, further comprising adapting the maximum speed based on one or more of an information handling device type, an input sensor type, and a display size of the information handling device, a software application in use, and a current task being performed.

13. A computer program product comprising a non-transitory storage device storing machine readable code executed by a processor to perform the operations of:
receiving an activation indicator based on physical input from a user and activating a velocity gesture option in response to receiving the activation indicator, wherein the activation indicator is received by physical input selected from a group consisting of a tap on an input sensor in communication with an information handling device, a switch located on the information handling device and beneath the input sensor, a switch located on the information handling device and positioned away from the input sensor, a button located on the information handling device and beneath the input sensor, and a button located on the information handling device and positioned away from the input sensor;
detecting fulfillment of velocity gesture criteria on the input sensor after receiving the activation indicator, the input sensor selected from the group consisting of a touch sensor and an optical sensor, the velocity gesture criteria comprising drag and hold criteria and a movement below a maximum speed for a velocity gesture function, wherein the detecting comprises determining that a speed for a velocity gesture does not go above the maximum speed, and wherein the velocity gesture comprises a single touch of the input sensor by a user during which contact with the input sensor is maintained after a contact point is sensed by the input sensor;
initiating the velocity gesture function on the information handling device in response to the activated velocity gesture option and detecting fulfillment of the velocity gesture criteria, wherein the velocity gesture function comprises a coasting function in which a movement on a display is maintained without the user continually providing input to sustain the movement on the display; and
adapting one or more of the velocity gesture criteria based on a learning mode in which the user demonstrates a movement the user would like to trigger the velocity gesture function, and the velocity gesture criteria is determined from the movement the user demonstrates, wherein adapting one or more of the velocity gesture criteria comprises increasing the maximum speed for the velocity gesture function in response to a predetermined number of movements within a predetermined time frame being above a predetermined speed, and wherein the maximum speed is increased to a speed higher than the predetermined speed.

14. The computer program product of claim 13, wherein the velocity gesture criteria further comprise one or more of a minimum speed, a minimum distance traveled across the input sensor, and a minimum delay following initial movement.

15. The computer program product of claim 13, further comprising adapting the maximum speed based on one or more of an information handling device type, an input sensor type, and a display size of the information handling device.

* * * * *